(12) United States Patent
Brown

(10) Patent No.: US 9,599,202 B2
(45) Date of Patent: Mar. 21, 2017

(54) INTERNAL RECIRCULATION INSERT FOR A BALL SCREW AND BALL SCREW ASSEMBLY INCLUDING THE INSERT

(75) Inventor: Mark Brown, Lakewood, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 555 days.

(21) Appl. No.: 12/971,473

(22) Filed: Dec. 17, 2010

(65) Prior Publication Data

US 2011/0146436 A1 Jun. 23, 2011

Related U.S. Application Data

(60) Provisional application No. 61/288,032, filed on Dec. 18, 2009.

(51) Int. Cl.
   *F16H 1/14* (2006.01)
   *F16H 25/22* (2006.01)

(52) U.S. Cl.
   CPC .... *F16H 25/2223* (2013.01); *Y10T 74/19749* (2015.01)

(58) Field of Classification Search
   CPC ..... B62D 3/06; B62D 5/0448; F16H 25/2214; F16H 2025/2242
   USPC ... 74/424.82, 424.83, 424.84, 424.7, 424.94, 74/441, 499, 509
   See application file for complete search history.

(56) References Cited

U.S. PATENT DOCUMENTS

| | | | | |
|---|---|---|---|---|
| 2,634,624 A | * | 4/1953 | Burt | 74/388 PS |
| 3,121,345 A | * | 2/1964 | Zeigler et al. | 92/116 |
| 4,557,156 A | * | 12/1985 | Teramachi | 74/424.86 |
| 4,582,364 A | * | 4/1986 | deMey, III | 299/107 |
| 4,924,722 A | * | 5/1990 | Bacardit et al. | 74/424.83 |
| 5,193,409 A | * | 3/1993 | Babinski | 74/424.83 |
| 5,492,030 A | * | 2/1996 | Benton et al. | 74/441 |
| 5,697,252 A | * | 12/1997 | Yamaguchi et al. | 74/441 |
| 5,937,700 A | | 8/1999 | Brown et al. | 74/424.86 |
| 6,082,210 A | * | 7/2000 | Ise | 74/424.83 |
| 6,378,646 B1 | * | 4/2002 | Bugosh | 180/444 |
| 6,732,599 B2 | * | 5/2004 | Michioka et al. | 74/89.4 |
| 6,851,330 B2 | * | 2/2005 | Buchanan et al. | 74/424.78 |
| 7,516,681 B2 | * | 4/2009 | Hsu | 74/424.86 |
| 7,631,572 B2 | * | 12/2009 | Fujita et al. | 74/424.82 |
| 7,640,820 B1 | * | 1/2010 | West et al. | 74/424.82 |
| 7,694,600 B2 | * | 4/2010 | Osterlaenger et al. | 74/424.82 |
| 7,934,438 B2 | * | 5/2011 | Chen et al. | 74/89.44 |
| 8,033,195 B2 | * | 10/2011 | Michioka et al. | 74/424.82 |

(Continued)

*Primary Examiner* — William Kelleher
*Assistant Examiner* — Zakaria Elahmadi
(74) *Attorney, Agent, or Firm* — Simpson & Simpson, PLLC

(57) ABSTRACT

An internal ball recirculation insert for a ball screw assembly. The ball screw assembly having a ball nut with at least one radial bore though it, a ball screw and load bearing balls. The ball screw and ball nut having complimental helical grooves, forming helical ball raceways when the ball screw and ball nut are assembled. The internal ball recirculation insert sized to fit into the radial bore of the ball nut, having a body portion, securing arms, a ball channel for channeling balls from one ball raceway to another and a friction or retention device around the circumference of the body portion. The friction device extending outwardly from a side wall of the recirculation insert, and contacting a wall of the radial bore in the ball nut.

19 Claims, 8 Drawing Sheets

(56) References Cited

U.S. PATENT DOCUMENTS

| | | | |
|---|---|---|---|
| 8,256,316 B2* | 9/2012 | Jayaram | 74/424.88 |
| 8,272,289 B2* | 9/2012 | Teramachi et al. | 74/424.86 |
| 8,291,785 B2* | 10/2012 | Shige et al. | 74/424.82 |
| 8,640,564 B2* | 2/2014 | Lee | 74/424.87 |
| 2001/0038724 A1* | 11/2001 | Murata | 384/44 |
| 2003/0051569 A1* | 3/2003 | Kapaan et al. | 74/424.85 |
| 2004/0154421 A1* | 8/2004 | Pfister | 74/424.82 |
| 2005/0000309 A1* | 1/2005 | Perni et al. | 74/424.82 |
| 2005/0087029 A1* | 4/2005 | Perni et al. | 74/89.4 |
| 2006/0169079 A1* | 8/2006 | Lee et al. | 74/424.82 |
| 2007/0221002 A1* | 9/2007 | Pan | 74/424.82 |
| 2009/0133523 A1* | 5/2009 | Song | 74/424.82 |
| 2009/0293658 A1* | 12/2009 | Michioka et al. | 74/424.87 |
| 2010/0122596 A1* | 5/2010 | Lin | 74/424.83 |
| 2010/0282011 A1* | 11/2010 | Nishimura et al. | 74/424.82 |
| 2010/0307271 A1* | 12/2010 | Hsu et al. | 74/424.82 |
| 2011/0100143 A1* | 5/2011 | Borza | 74/424.82 |
| 2011/0120247 A1* | 5/2011 | Osterlaenger et al. | 74/424.82 |
| 2011/0138948 A1* | 6/2011 | Jimenez et al. | 74/424.82 |
| 2011/0154926 A1* | 6/2011 | Lee | 74/424.86 |

* cited by examiner

INTERNAL RECIRCULATION INSERT FOR A BALL SCREW AND BALL SCREW ASSEMBLY INCLUDING THE INSERT

BACKGROUND

The present invention relates to ball screw and nut mechanisms wherein helical grooves are formed in the nut and screw to form raceways for load bearing and recirculation balls, and crossovers are provided as ball return elements.

Ball screws are mechanical devices widely used to convert rotary motion of either the nut or the screw into linear motion of the other. Matching helical grooves in the screw and nut form raceways within which balls roll when either the nut or screw are rotating. As the balls roll in response to this rotational motion they reach one end of the assembly and must be recirculated in a continuous path towards, but not necessarily all the way to the opposite end of the assembly, forming a closed circuit. In order to achieve this recirculation of the balls in the system, there are generally two types of return systems; external and internal. External ball return systems generally involve external ball return tubes which protrude above and around the outside diameter of the ball nut. Internal ball return systems generally involve the ball returning through or along the nut wall, but below the outside diameter. This invention relates to an internal ball return system.

There are several variations of internal ball return systems. In one variation, sometimes termed a "flop-over" design, the ball is forced to climb over the crest of the thread by the return system. In this system, the balls make often less than a full revolution of the shaft and the circuit is closed by a ball deflector that allows the balls to cross over adjacent grooves or thread crests. These ball deflectors often comprise a separately manufactured component, or crossover block, that is inserted, either from the internal diameter or the external diameter of the ball nut, through an opening in the ball nut. This machined slot or bore may have additional retention features incorporated to aid in the retention of the crossover block or may be simply be a straight-walled machined bore or slot, relying on retention features in the deflector. The deflector, whether inserted through the internal surface or the external surface of the ball nut, contains a ball pathway or channel through the center portion of the deflector, often curved in such a way and with a large enough radius such that balls may move over the aforementioned thread crests and recirculate into an adjacent ball raceway.

In another variation of the internal ball return system, the balls are returned to the opposite end of the nut through the nut wall utilizing a hole, or along the nut wall utilizing a channel, still below the outside diameter of the ball nut.

The crossover block of an internal ball return system may be retained in the opening of the ball nut with a press fit or a number of other retention features, including adhesives. If inserted from the interior of the ball nut, this retention may include a step feature towards the outer surface of the ball nut, such that the block is prevented from exiting the ball screw assembly through the hole or slot in the ball nut during operation. In addition, where the crossover block is inserted from the interior of the ball nut it is often only with a slip fit so that the block is retained in place by the constant recirculation of balls in the ball screw assembly. This arrangement allows for some minor movement of the crossover block while the balls recirculate, in turn, possibly causing noise and vibration. In addition, with these movements of the crossover block, the ingress/egress of the balls through the crossover block ball channel changes, possibly impacting ball velocity and causing ball to ball noise and friction.

The principle requirement of retaining such a crossover block within the hole through the ball nut is that the block be aligned properly, such that the ball threads align with the ball channel in the crossover block in order to provide an unobstructed path for recirculation of the balls. For that reason, it is known to locate the crossover block in relation to the interior surface, rather than an exterior surface or step, of the ball nut even where the block is inserted from the exterior of the ball nut, as it allows for less variation and better alignment of the crossover block channel and the ball threads. An example of such an arrangement is disclosed in U.S. Pat. No. 5,937,700, wherein tabs are formed on compressible arms that are pushed inwards during assembly and extend outwards once the tabs align with the ball raceways of the ball screw assembly. This arrangement is necessarily a slip fit, retained mainly by the constant recirculation of balls within the ball screw and through the crossover block channel.

SUMMARY OF THE INVENTION

Certain terminology is used in the following description for convenience and descriptive purposes only, and is not intended to be limiting to the scope of the claims. The terms "recirculation insert" and "crossover block" are used interchangeably. The terminology includes the words specifically noted, derivatives thereof and words of similar import.

The present invention relates to an internal recirculation insert for recirculating balls between adjacent raceways of a ball screw assembly. The internal recirculation insert has a body portion, either formed in one piece or multiple pieces and later joined, including a top wall, bottom wall and four side walls and a ball passage in the bottom wall that extends through the body portion to recirculate balls within the ball screw assembly from one helical raceway to another.

The internal recirculation insert is prevented from exiting the ball screw assembly, and particularly, the radial bore of the ball nut, by arms extending outwardly from the body portion of the internal recirculation insert and seating in adjacent helical raceways of the ball screw assembly. Other retention elements are possible, however, this configuration requires minimal or no additional machining of the radial bore of the ball nut. In order to more securely hold the recirculation insert within the radial bore, a friction or increased fit feature is included or added to the internal recirculation insert. This feature may include any number of elements, such as; an angularly extending tab machined or molded into the sides of the internal recirculation insert in contact with the walls of the radial bore of the ball nut; a similar metal or other rigid band seated into a groove in the body portion of the insert, also with an angularly extending tab in contact with the walls of the radial bore of the ball nut; a rubber or other malleable material o-ring seated in a groove in the body portion of the insert and in contact with the walls of the radial bore of the ball nut; or other such devices.

Any of these friction means operate to tightly secure the recirculating insert within the radial bore of the ball nut. Among other outcomes, this increased fit maintains a constant position of the insert relative to the helical raceways of the ball screw assembly, allowing for smooth transport of the balls from one raceway to another without any oscillation or associated movement or vibration of the insert.

BRIEF DESCRIPTION OF DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

DETAILED DESCRIPTION OF THE INVENTION

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner.

Figure 1:
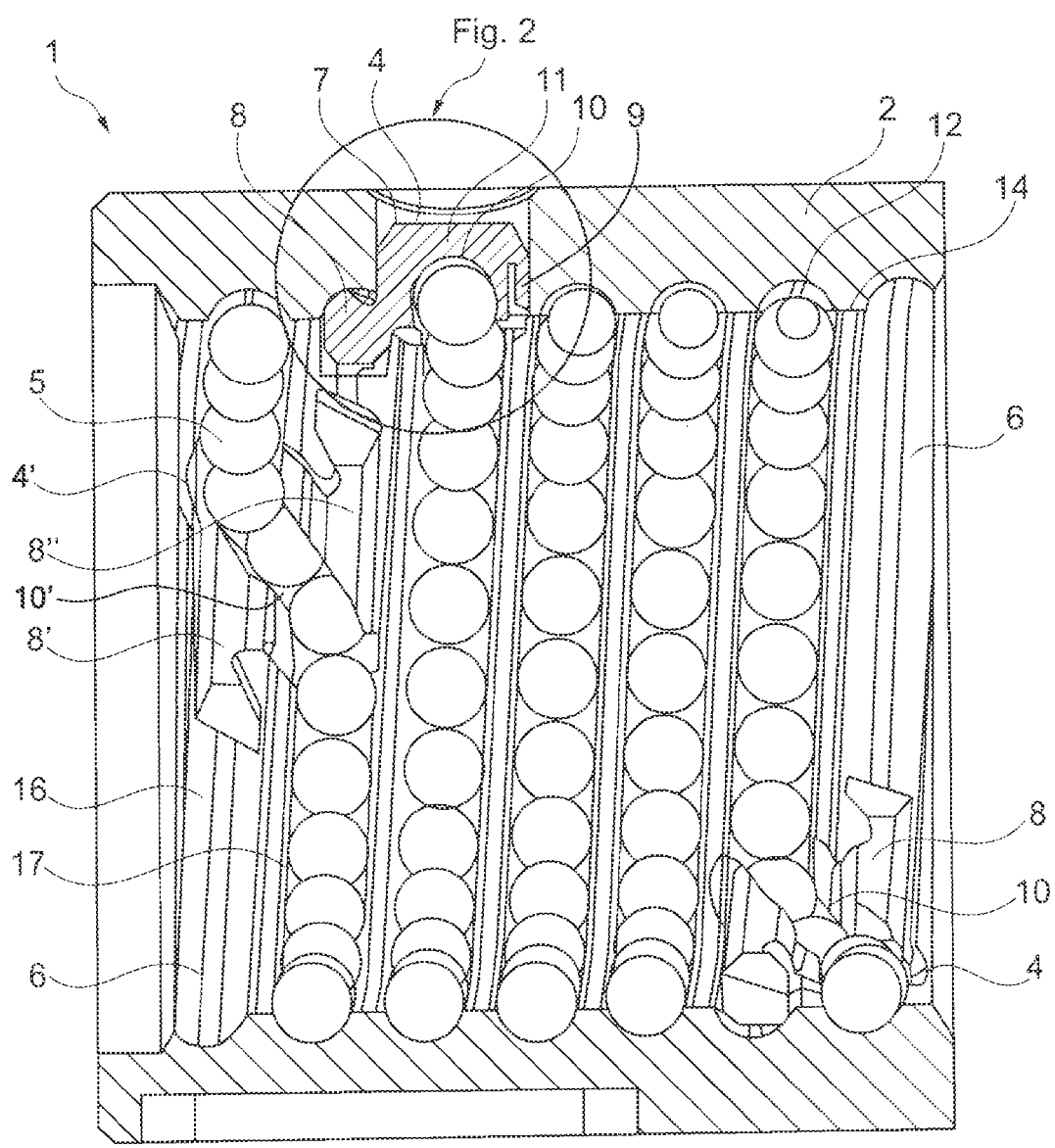
FIG. 1 is a cross sectional view of a ball screw assembly, with the ball screw removed, including the internal recirculation insert with integral angular tab according to one embodiment of the invention.

FIG. 1 shows a cross sectional view of a ball screw assembly 1. Ball screw assembly 1 comprises ball nut 2, ball screw (not shown), internal recirculation insert 4, balls 5, helical raceways 6, and ball nut radial bore 7. Ball nut 2 encircles ball screw (not shown), and includes complimental ball nut helical grooves 12 and complimental ball nut helical groove thread land 14 on the interior surface of ball nut 2. Helical raceways 6 are formed by aligning ball nut helical grooves 12 with ball screw helical grooves (not shown) and ball nut helical groove thread land 14 with ball screw helical thread land (not shown). Within raceways 6, a plurality of load bearing balls 5 are placed in order to transfer rotational movement of one of the ball screw (not shown) or ball nut 2, into axial movement of the other.

Within ball nut 2 is at least one radial bore 7 extending through ball nut 2 into the interior of ball screw assembly 1. Internal recirculating insert 4 is inserted into radial bore 7. Internal recirculating insert 4, in turn, comprises securing arms 8, tabs 9, ball channel 10, and body portion 11. Internal recirculating insert 4 includes outwardly extending securing arms 8 which, in this embodiment, seat in adjacent helical raceways 6, providing location for ball channel 10 to transfer balls 5 between adjacent raceways 6 and also radially securing internal recirculating insert 4 within ball nut 2. For example, the embodiment shown in FIG. 1 includes several radial bores 7, each including an internal recirculating insert 4. The left most internal recirculating insert 4', has securing arm 8' seated in turn 16 and 8" seated in turn 17, thus ball channel 10' recirculates balls 5 between turn 16 and 17. Generally, ball channel 10' must have a sufficiently deep central portion to permit balls 5 to travel from turn 16 over ball screw helical land (not shown) into turn 17. In turn, ball channel 10 may be of a generally round curvature or may be of several other configurations, such as a gothic arch. The configuration, construction and operation of ball channel 10 is known in the art and may be determined by those skilled in the art for any particular application.

Figure 2:
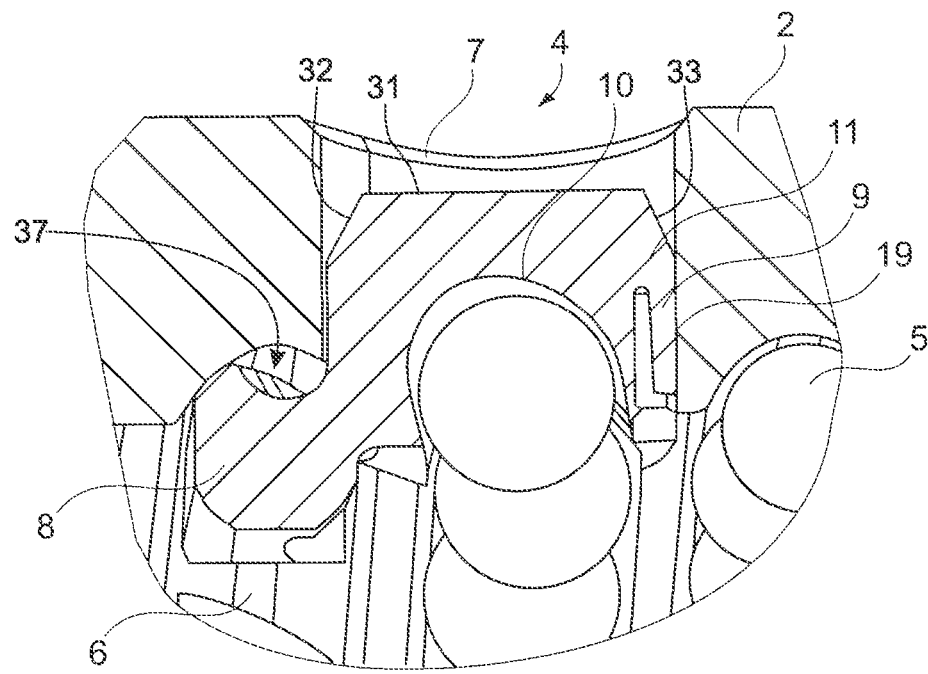
FIG. 2. is an enlarged cross sectional view of the internal recirculation insert of FIG. 1.

As may be seen in FIG. 1, and perhaps more clearly in FIG. 2, although securing arms 8 prevent internal recirculating insert 4 from exiting ball nut 2 through radial bore 7 and loosely keep internal recirculating insert 4 in a set radial and axial position, in general internal recirculating insert 4 can be assembled into radial bore 7 with a slip fit, allowing some minor movement or oscillation as balls 5 recirculate through ball channel 10. Securing arms 8 form air gaps 37, one of which is shown in FIG. 2, in raceways 6. In an example embodiment, securing arms 8 form air gaps 37 in adjacent raceways 6. In an example embodiment, air gaps 37 are formed radially between securing arms 8 and ball nut helical grooves 12. In an example embodiment, air gaps 37 are formed radially between securing arms 8 and adjacent ball nut helical grooves 12. In other words, air gaps 37 are arranged radially outward of securing arms 8.

In this embodiment, angular tabs 9 are machined or molded into body portion 11 of internal recirculating insert 4 and are proximate with ball nut radial bore walls 19, effecting a tighter fit between radial bore 7 and body portion 11, keeping internal recirculating insert 4 in a more stable position throughout operation of ball screw assembly 1. Top wall 21 of the internal recirculation insert 4 includes cylindrical surface 31 and annular surfaces 32 and 33. Cylindrical surface 31 connects annular surface 32 with annular surface 33.

Figure 3:
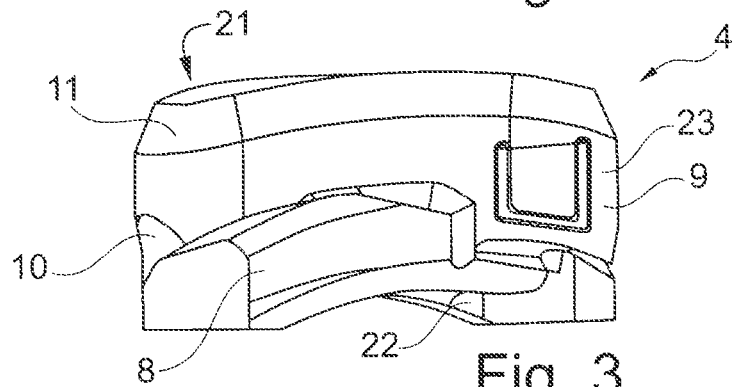
FIG. 3 is an enlarged isometric view of the internal recirculation insert of FIG. 1, showing the integrally molded or machined tab and securing arms extending from the sides of the body of the internal recirculating insert.

FIG. 3 shows an enlarged isometric view of the internal recirculating insert 4. Body portion 11 may be formed in a single piece or durable material or of several pieces and later joined together. In either case, at least one tab 9, and possibly a plurality of tabs, is molded, machined or otherwise formed into side walls 23 of body portion 11. Tab 9, shown here, is of a generally rectangular configuration, although other configurations are possible.

Figure 4:
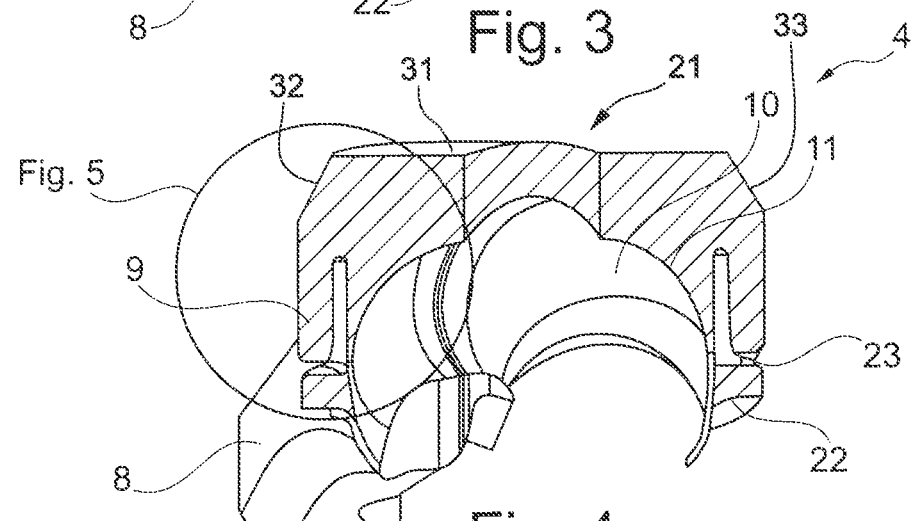
FIG. 4 is an enlarged rear cross sectional view of the internal recirculating insert of FIG. 1, showing integrally molded or machined tabs on opposing sides of the internal recirculating insert.

FIG. 4 is a cross sectional view of internal recirculating insert 4, showing the complex curvature of ball channel 10 within bottom wall 22 of body portion 11, securing arm 8 extending outwardly from body portion 11 and tabs 9, in this case diametrically opposed. Although body portion 11 is of a generally oblong shape, sidewall 23 lies flat and parallel relative to radial bore walls 19. From this surface, tabs 9 protrude at a small angle in order to contact radial bore walls 19. Although not required for this invention, in this embodiment side wall 23 is shown as having an approximately right angled relationship relative to top wall 21.

Figure 5:
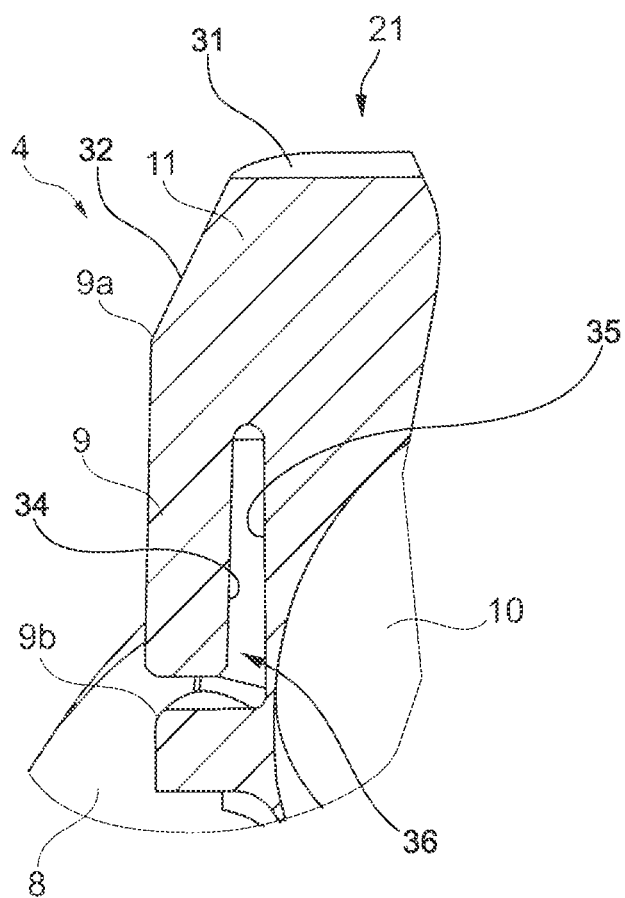
FIG. 5 is a further enlarged cross sectional view of the tab shown in FIG. 4.
Figure 5:
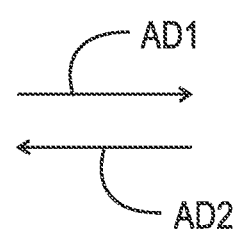

FIG. 5 is an enlarged cross sectional view of tab 9 shown in FIG. 4. The small angular protrusion of tab 9 relative to a planar surface taken from point 9a to point 9b is more clearly shown. Tab 9 includes side surface 34 and body portion 11 includes side surface 35. Side surface 34 faces axial direction AD1 and side surface 35 faces axial direction AD2, opposite axial direction AD1. Side surface 34 and side surface 35 form air gap 36 between friction element 9 and body portion 11.

Figure 6:
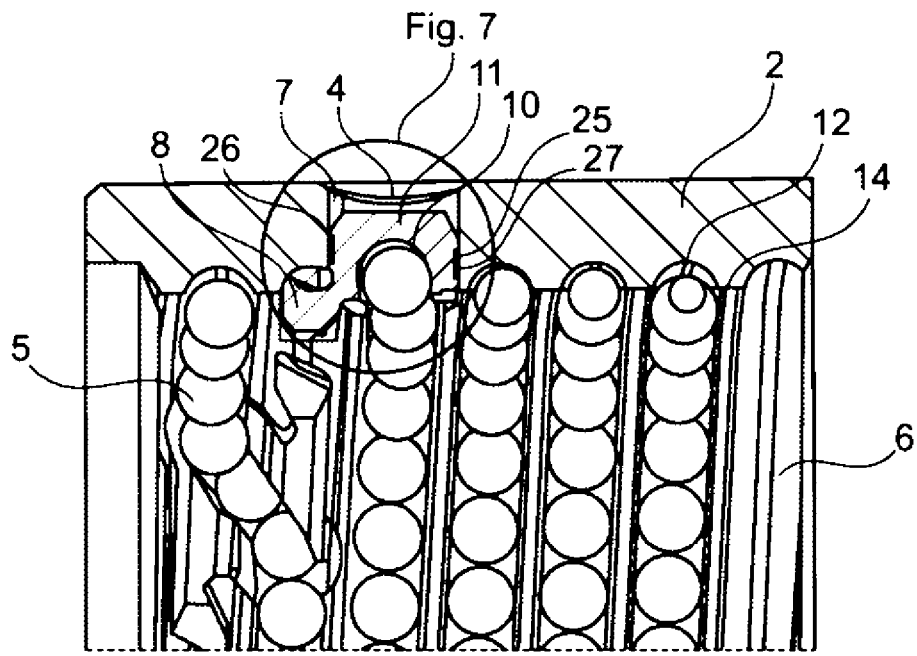
FIG. 6 is a cross sectional view of a ball screw assembly, with the ball screw removed, with another embodiment of the invention, showing a rigid band seated in place in a molded or machined groove in the circumferential surface of the internal recirculating insert.

FIG. 6 shows a cross sectional view of a further embodiment of the present invention. Ball screw assembly 1 remains the same as that shown in FIG. 1, comprising ball nut 2, ball screw (not shown), internal recirculation insert 4, balls 5, helical raceways 6, and ball nut radial bore 7. However, in this embodiment rather than internal recirculation insert 4 having an integrally molded or machined tab, insert 4 has a circumferential band groove 26 within which rigid band 25 may be seated. Rigid band 25 may be formed of a metallic or other substance and is formed around the circumference of body portion 11, seating in band groove 26. Rigid band tabs 27 extend outwardly from the planar surface of rigid band 25, also contacting radial bore walls 19, much like tabs 9 of the previous embodiment.

Figure 7:
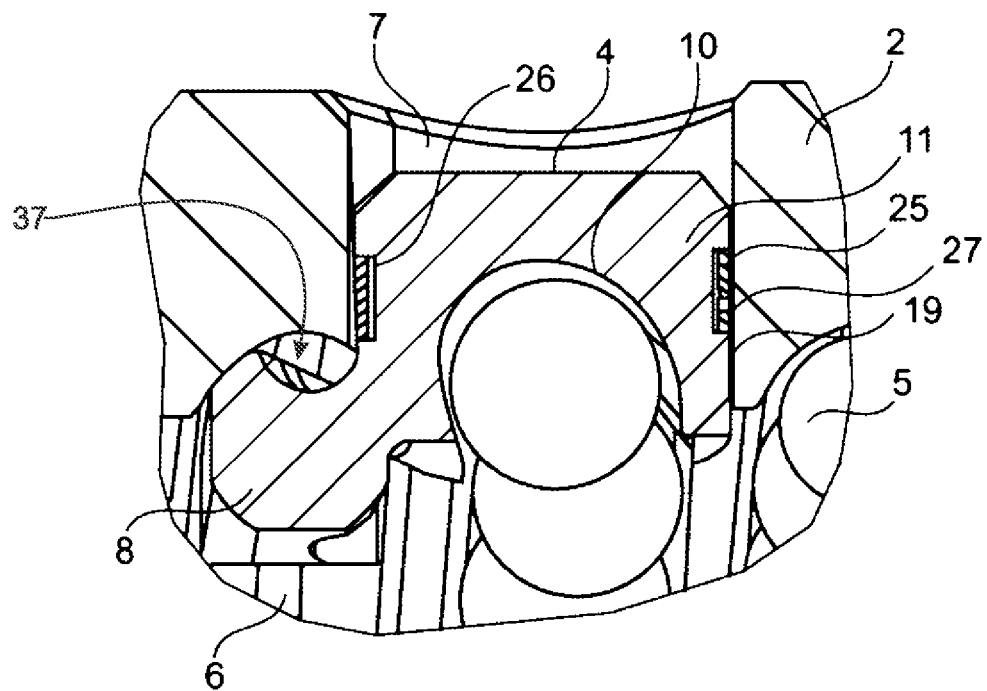
FIG. 7 is a an enlarged cross sectional view of the internal recirculating insert of FIG. 6.

FIG. 7 shows an enlarged cross sectional view of the internal recirculating insert of FIG. 6. Here, rigid band tabs 27 are more clearly visible, extending outward from a generally planar surface parallel with radial bore walls 19, and contacting radial bore walls 19 with sufficient force to secure internal recirculating insert 4 within radial bore 7. Securing arms 8 prevent internal recirculating insert 4 from exiting ball nut 2 through radial bore 7 and loosely keep internal recirculating insert 4 in a set radial and axial position such that internal recirculating insert 4 is assembled into radial bore 7 with a slip fit, allowing some minor movement or oscillation as balls 5 recirculate through ball channel 10. Securing arms 8 form air gaps 37, one of which is shown in FIG. 7, in raceways 6. In an example embodiment, securing arms 8 form air gaps 37 in adjacent raceways 6. In an example embodiment, air gaps 37 are formed radially between securing arms 8 and ball nut helical grooves 12. In an example embodiment, air gaps 37 are formed radially between securing arms 8 and adjacent ball nut helical grooves 12. In other words, air gaps 37 are arranged radially outward of securing arms 8.

Figure 8:
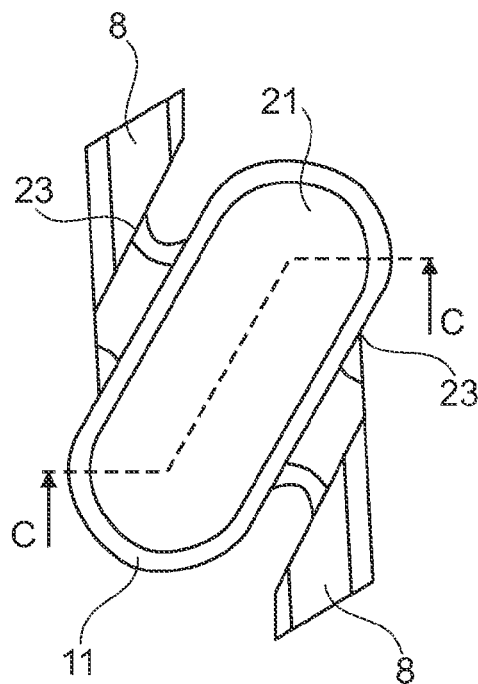
FIG. 8 is a top view of the internal recirculating insert of FIG. 7, showing extended securing arms and no rigid band around the circumference of the insert.

FIG. 8 is a top view of internal recirculating insert 4 of the embodiment shown in FIG. 6, without rigid band 25 seated in place. Securing arms 8 extend outwardly from side walls 23 in body portion 11. In this embodiment, internal recirculating insert 4 has a generally oblong configuration, with securing arms 8 extending from the two longer side walls 23. Also, side walls 23 lie at an approximate right angle to top wall 21.

Figure 9:
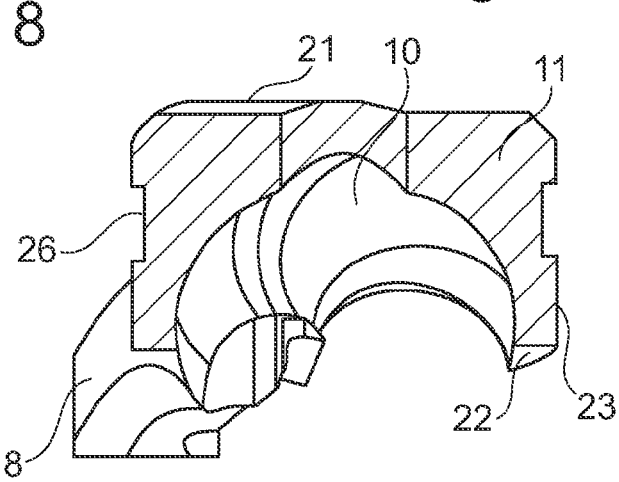
FIG. 9 is a cross sectional view of the insert of FIG. 8 along line C-C, showing a grooved circumferential slot without a rigid band seated in place.

FIG. 9 is a cross sectional view of FIG. 8 taken through line C-C. Once again are shown ball channel 10, body portion 11, top wall 21, side wall 23 and bottom wall 22. Band groove 26 is shown without rigid band 25 seated within and is of a generally rectangular configuration, however other cross sectional configurations are possible.

Figure 10:
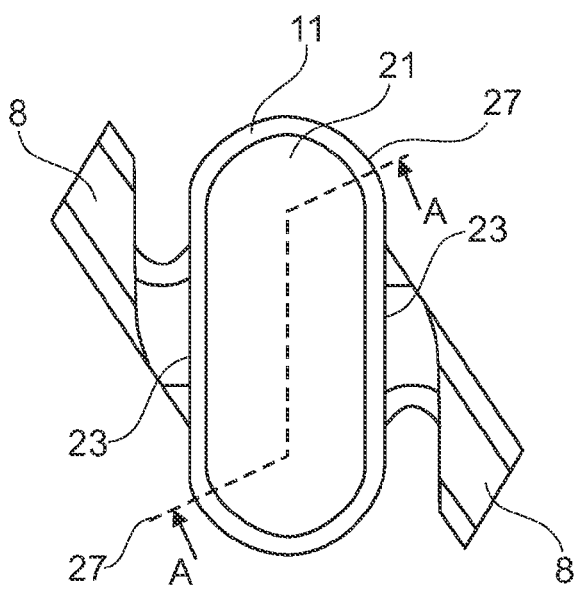
FIG. 10 is a top view of the internal recirculating insert of FIG. 7, showing extended securing arms and a rigid band around the circumference of the insert, with protruding tabs.

FIG. 10 is a top view of internal recirculating insert 4 of the embodiment shown in FIG. 6 and FIG. 8, with rigid band 25 seated in place. As shown in FIG. 8, securing arms 8 extend outwardly from side walls 23 in body portion 11. In addition, rigid band tabs 27 are shown extending outward from the surface plane of side wall 23.

Figure 11:
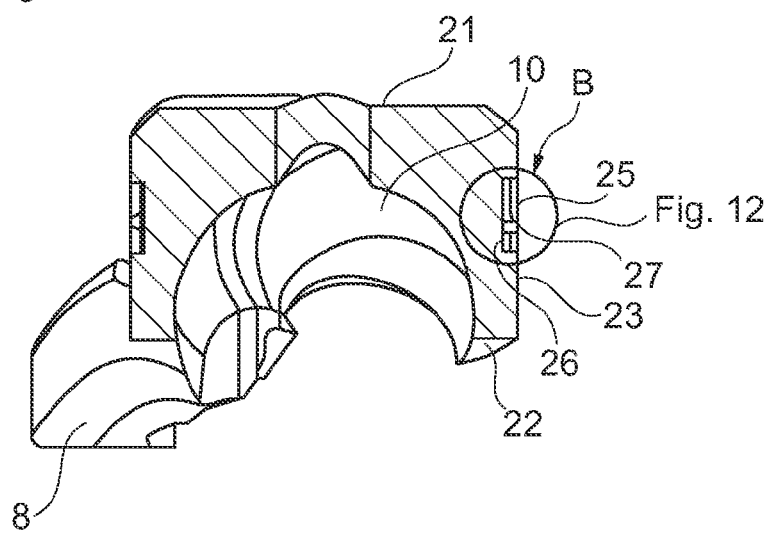
FIG. 11 is a cross sectional view of the insert of FIG. 10 along line A-A, showing a grooved circumferential slot with a rigid band and extending tabs seated in place.

FIG. 11 is a cross sectional view of FIG. 10 taken through line A-A. Once again are shown ball channel 10, body portion 11, top wall 21, side wall 23 and bottom wall 22. Rigid band 25 is shown seated within band groove 26. In this embodiment, rigid band tabs 27 are shown diametrically opposed to each other.

Figure 12:
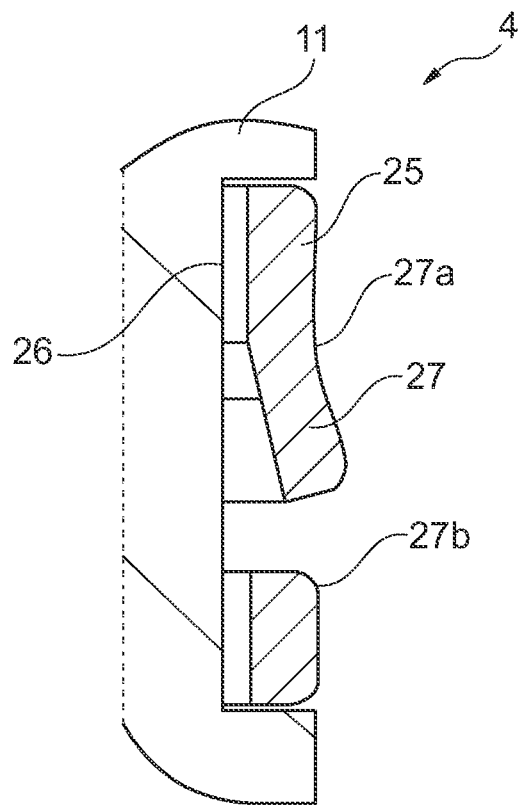
FIG. 12 is an enlarged cross sectional view of the seated rigid band of FIG. 11.

FIG. 12 is an enlarged cross sectional view of band groove 26 and rigid band 25 of FIG. 11. Here, it is more clearly visible the small angle of rigid band tabs 27 relative to a planar surface taken from point 27a to point 27b, generally running parallel to radial bore walls 19 (FIG. 6). Tabs 27 may be formed integrally with rigid band 25 or made separately and joined to rigid band 25.

Figure 13:
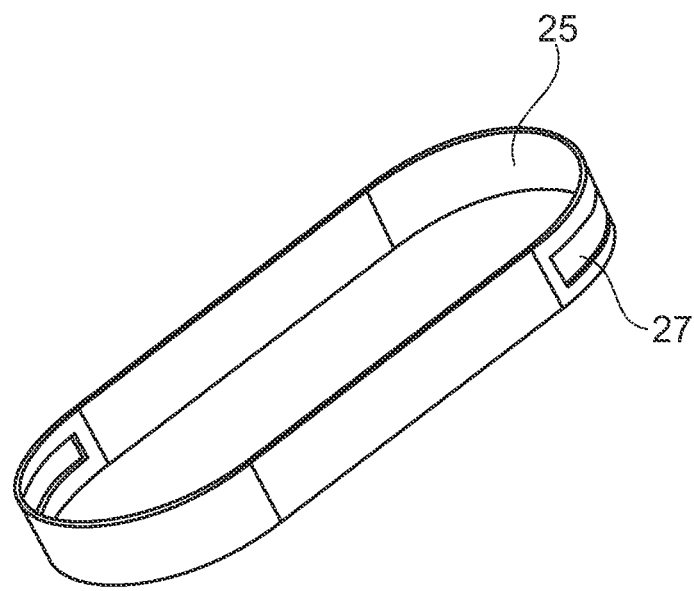
FIG. 13 is an isometric view of the rigid band shown in FIGS. 6, 7, 10, 11 and 12.

FIG. 13 is an isometric view of rigid band 25, showing the generally oblong shape matching the shape of body portion 11 (FIG. 8). Although two rigid band tabs are shown, any number are contemplated by this invention.

Figure 14:
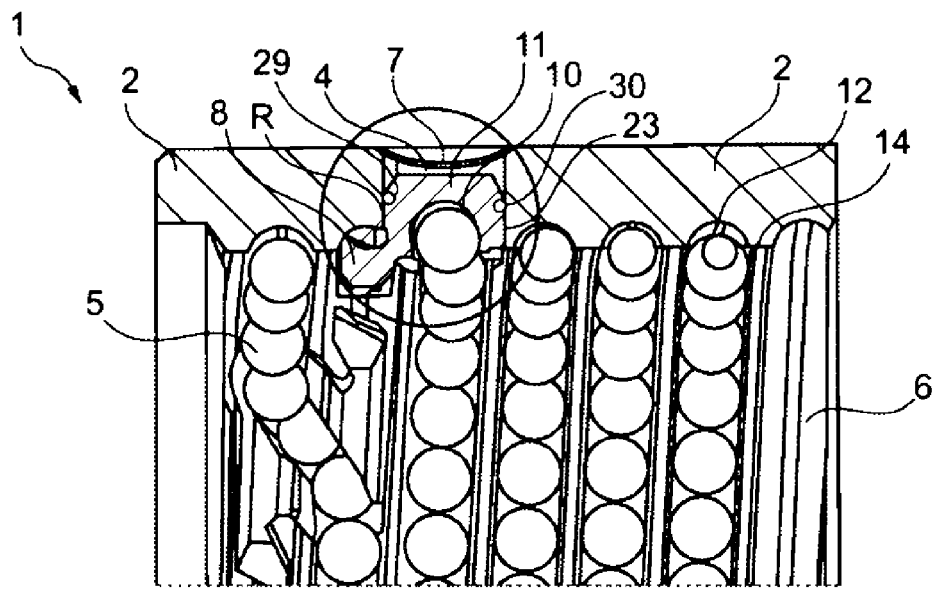
FIG. 14 is a cross sectional view of a ball screw assembly, with ball screw removed, with another embodiment of the invention, showing an o-ring seated in place in a molded or machined grove in the circumferential surface of the internal recirculating insert.

FIG. 14 shows a cross sectional view of a further embodiment of the present invention. Ball screw assembly 1 remains the same as that shown in FIG. 1, comprising ball nut 2, ball screw (not shown), internal recirculation insert 4, balls 5, helical raceways 6, and ball nut radial bore 7. In this embodiment o-ring groove 29 is provided on the circumference of body portion 11, within which o-ring 30 may seat. O-ring 30 must be of sufficient thickness to protrude from side wall 23 and contact radial bore wall 19, tightly securing internal recirculating insert 4 in radial bore 7.

Figure 15:
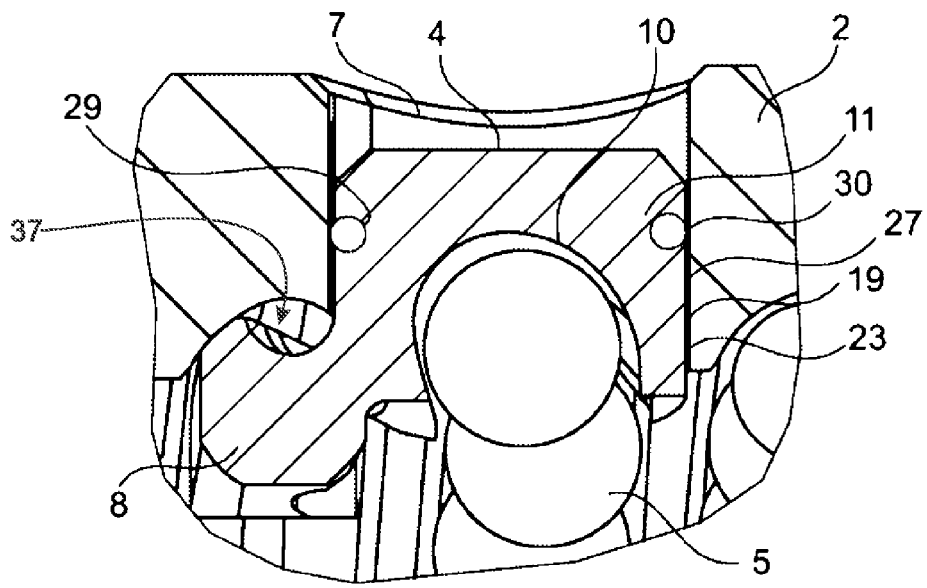
FIG. 15 is an enlarged cross-sectional view of FIG. 14.

FIG. 15 is an enlarged cross sectional view of internal recirculating insert 4 shown in FIG. 14. Once again, o-ring 30 seats in o-ring groove 29, protruding outwardly from the planar surface of side wall 23 and contacting radial bore wall 19, at least partially fixing internal recirculating insert 4 in place. Securing arms 8 prevent internal recirculating insert 4 from exiting ball nut 2 through radial bore 7 and loosely keep internal recirculating insert 4 in a set radial and axial position such that internal recirculating insert 4 is assembled into radial bore 7 with a slip fit, allowing some minor movement or oscillation as balls 5 recirculate through ball channel 10. Securing arms 8 form air gaps 37, one of which is shown in FIG. 7, in raceways 6. In an example embodiment, securing arms 8 form air gaps 37 in adjacent raceways 6. In an example embodiment, air gaps 37 are formed radially between securing arms 8 and ball nut helical grooves 12. In an example embodiment, air gaps 37 are formed radially between securing arms 8 and adjacent ball nut helical grooves 12. In other words, air gaps 37 are arranged radially outward of securing arms 8.

Figure 16:
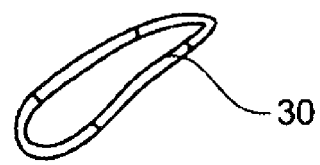
FIG. 16 is an isometric view of the o-ring of FIGS. 14 and 15.

FIG. 16 is an isometric view of o-ring 30. O-ring 30 is composed of any malleable material, such as rubber.

Figure 17:
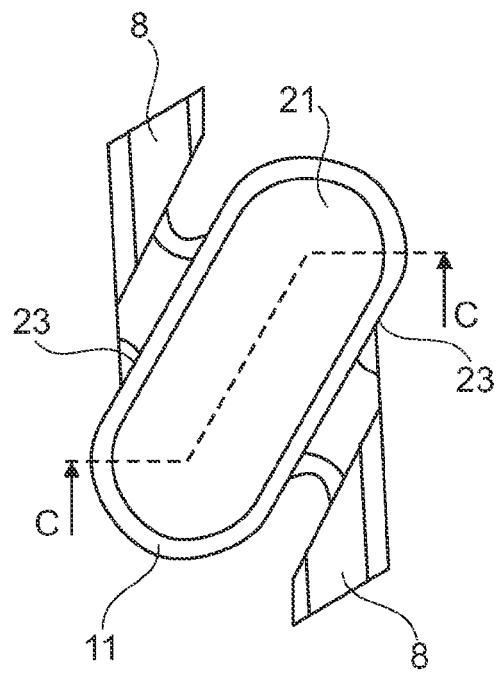
FIG. 17 is a top view of the internal recirculating insert of FIG. 14, without an o-ring seated in the circumferential groove of the insert.

FIG. 17 is a top view of internal recirculating insert 4 of the embodiment shown in FIG. 14, without o-ring 30. Securing arms 8 extend outwardly from side walls 23 in body portion 11.

Figure 18:
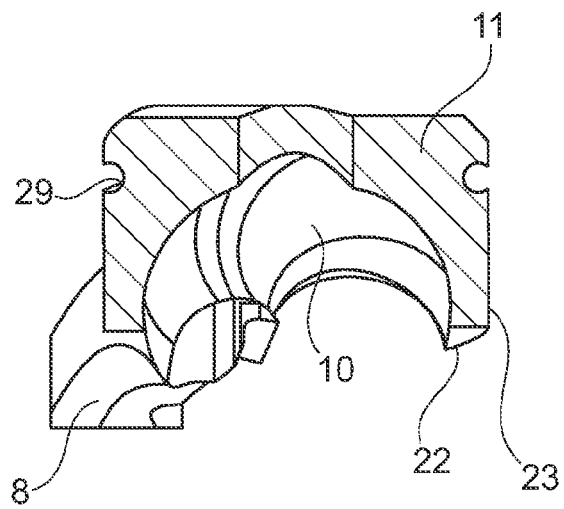
FIG. 18 is a cross sectional view of the internal recirculating insert of FIG. 17 along line C-C, showing the circumferential o-ring ring without an o-ring in place.

FIG. 18 is a cross sectional view of FIG. 17 taken through line C-C. Once again are shown ball channel 10, body portion 11, top wall 21, side wall 23 and bottom wall 22. O-ring groove 29 is more clearly visible.

Figure 19:
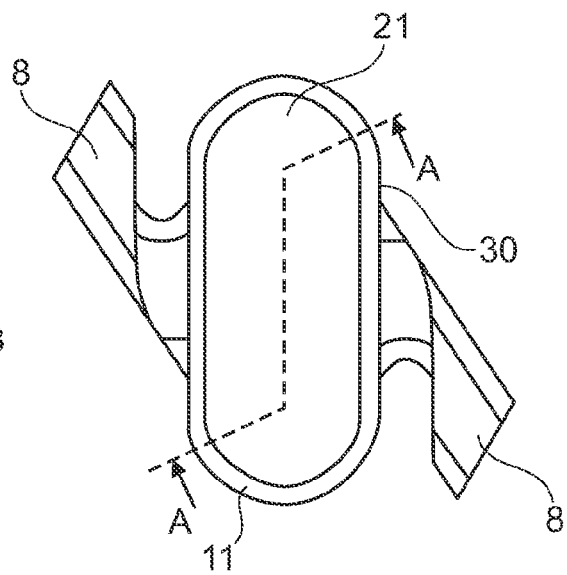
FIG. 19 is a top view of the internal recirculating insert of FIG. 14, with an o-ring seated in the circumferential groove of the insert.

FIG. 19 is a top view of internal recirculating insert 4 of the embodiment shown in FIG. 14, with o-ring 30. As in FIG. 17, securing arms 8 extend outwardly from side walls 23 in body portion 11.

Figure 20:
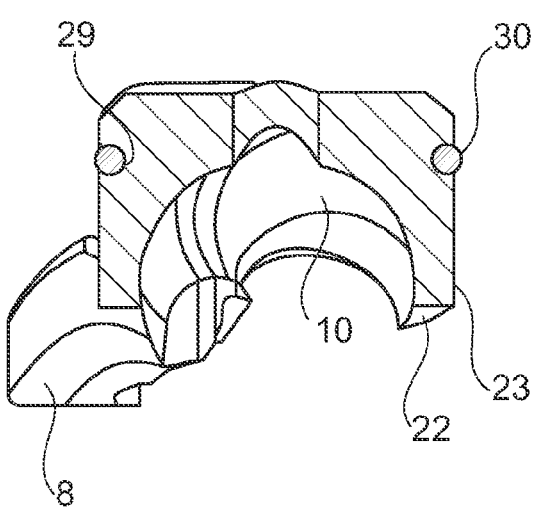
FIG. 20 is a cross sectional view of the internal recirculating insert of FIG. 19 along line A-A, showing the circumferential o-ring ring with an o-ring in place.

FIG. 20 is a cross sectional view of FIG. 19 taken through line A-A. Once again are shown ball channel 10, body portion 11, top wall 21, side wall 23 and bottom wall 22. O-ring groove 29 is more clearly visible with o-ring 30 seated in place. O-ring 30 protrudes past the planar surface created by side wall 23, entering into the gap between side wall 23 and radial bore wall 19 (FIG. 15).

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

LIST OF REFERENCE SYMBOLS

1 Ball Screw Assembly
2 Ball Nut
4 Internal Recirculation Insert
4' Left most Internal Recirculation Insert
5 Balls
6 Helical Raceways
7 Radial Bore
8 Securing Arms
9 Tabs
10 Ball Channel
10' Left most Ball Channel Connecting Turns 16 and 17
11 Body Portion
12 Ball Nut Helical Grooves
14 Ball Nut Helical Groove Thread Land
16 Turn
17 Turn
19 Radial Bore Walls
21 Top Wall
22 Bottom Wall
23 Side Wall
25 Rigid Band
26 Band Groove
27 Rigid Band Tabs
29 O-ring Groove
30 O-ring
31 Cylindrical Surface
32 Annular Surface
33 Annular Surface
34 Side Surface
35 Side Surface
36 Air Gap
37 Air Gap

What we claim is:

1. An internal recirculation insert for recirculating balls between adjacent raceways of a ball screw assembly, comprising:
   a body portion having a bottom wall and sidewalls;
   a ball channel extending through the bottom wall;
   a pair of securing arms extending outwardly from the body portion and inserted in the adjacent raceways to limit radial travel of the internal recirculation insert relative to the ball screw assembly, the pair of securing arms forming a pair of gaps arranged radially outward of the pair of securing arms and radially inward of the adjacent raceways; and,
   at least one friction element positionable on the sidewall to secure the internal recirculation insert in the ball screw assembly by a friction fit, wherein:
   the at least one friction element is operatively arranged to contact a radial surface of a radial bore of the ball screw assembly.

2. The internal recirculation insert recited in claim 1, wherein said body portion is formed of a single component.

3. The internal recirculation insert recited in claim 1, wherein said body portion is formed of at least two separately formed and joined components.

4. The internal recirculation insert recited in claim 1, wherein said ball channel has a contour of a generally spherical configuration.

5. The internal recirculation insert recited in claim 1, wherein said ball channel has a contour of a gothic arch configuration.

6. The internal recirculation insert recited in claim 1, wherein said pair of securing arms comprises opposing securing arms integrally formed with said body portion and extending outwardly from the sidewalls of the body portion which rest in adjacent helical turns of said ball screw assembly.

7. The internal recirculation insert recited in claim 1, wherein said at least one friction element comprises axially extending angularly oriented tabs integral with said body portion.

8. An internal recirculation insert for recirculating balls between adjacent raceways of a ball screw assembly, comprising:
   a body portion having a bottom wall and sidewalls;
   a ball channel extending through the bottom wall;
   a pair of securing arms extending outwardly from the body portion and inserted in the adjacent raceways to limit radial travel of the internal recirculation insert relative to the ball screw assembly, the pair of securing arms forming a pair of gaps arranged radially outward of the pair of securing arms and radially inward of the adjacent raceways; and, at least one friction element positionable on the sidewall to secure the internal recirculation insert in the ball screw assembly by a friction fit, wherein:

the at least one friction element is operatively arranged to contact a radial surface of a radial bore of the ball screw assembly; and, said at least one friction element comprises a separately formed rigid material band assembled into a slot integrally formed around a circumference of said body portion of said internal recirculation insert, the band having axially extending angularly oriented tabs formed thereon over at least a portion of said band.

9. The internal recirculation insert recited in claim 1, wherein said at least one friction element comprises a separately formed o-ring assembled into a slot integrally formed around a circumference of said body portion of said internal recirculation insert.

10. A ball screw assembly, comprising:
a ball nut having a first exterior surface and an interior surface opposite the exterior surface with adjacent helical grooves formed therein;
a radial bore extending through the ball nut into the interior surface;
a ball screw having a second exterior surface with adjacent helical grooves formed therein, the adjacent helical grooves of the ball nut and the adjacent helical grooves of the ball screw forming adjacent raceways;
a plurality of balls provided in the adjacent raceways;
an internal recirculation insert inserted into the radial bore for recirculating the plurality of balls between the adjacent raceways and having:
a body portion including sidewalls and a bottom wall;
a ball channel extending through the bottom wall;
a pair of securing arms extending from the body portion and inserted in the adjacent helical grooves of the ball nut and forming at least one gap arranged radially outward of the pair of securing arms and radially inward of the adjacent helical grooves of the ball nut; and,
a friction element protruding from the sidewalls and contacting a radial surface of the radial bore to secure the internal recirculation insert within the ball screw assembly by a friction fit.

11. The ball screw assembly recited in claim 10, wherein said body portion of said internal recirculation insert is formed of a single component.

12. The ball screw assembly recited in claim 10, wherein said body portion of said internal recirculation insert is formed of at least two separately formed and joined components.

13. The ball screw assembly recited in claim 10, wherein said ball channel of said internal recirculation insert has a contour of a generally spherical configuration.

14. The ball screw assembly recited in claim 10, wherein said ball channel has a contour of a gothic arch configuration.

15. The ball screw assembly recited in claim 10, wherein said pair of securing arms of said internal recirculation insert comprises opposing securing arms integrally formed with said body portion which rest in the adjacent raceways of said ball screw assembly.

16. The ball screw assembly recited in claim 10, wherein said pair of securing arms comprises a ledge in said radial bore of said ball nut on which said internal recirculation insert may sit, either on the interior or exterior surface of said internal recirculation insert.

17. The ball screw assembly recited in claim 10, wherein said friction element of said internal recirculation insert comprises axially extending angularly oriented tabs integrally formed into said body portion.

18. The ball screw assembly recited in claim 10, wherein said friction element of said internal recirculation insert comprises a separately formed rigid material band assembled into a slot integrally formed around a circumference of said body portion of said internal recirculation insert, the band having axially extending angularly oriented tabs formed thereon over at least a portion of said band.

19. The ball screw assembly recited in claim 10, wherein said friction element of said internal recirculation insert comprises a separately formed o-ring assembled into a slot integrally formed around a circumference of said body portion of said internal recirculation insert.

* * * * *